United States Patent
Pichaimurthy et al.

(10) Patent No.: US 11,609,925 B2
(45) Date of Patent: *Mar. 21, 2023

(54) SYSTEMS AND METHODS FOR AUTOMATICALLY RECOMMENDING CONTENT

(71) Applicant: Rovi Guides, Inc., San Jose, CA (US)

(72) Inventors: Rajendran Pichaimurthy, Karnataka (IN); Dolphin Masilamany Santha, Karnataka (IN); Gyanveer Singh, Bihar (IN); Prakash Viswanathan, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,305

(22) Filed: Apr. 20, 2022

(65) Prior Publication Data

US 2022/0318238 A1   Oct. 6, 2022

Related U.S. Application Data

(63) Continuation of application No. 17/020,385, filed on Sep. 14, 2020, now Pat. No. 11,341,152.

(51) Int. Cl.
G06F 16/248 (2019.01)
G06F 16/2457 (2019.01)
G06N 5/02 (2006.01)

(52) U.S. Cl.
CPC ...... G06F 16/248 (2019.01); G06F 16/24575 (2019.01); G06N 5/02 (2013.01)

(58) Field of Classification Search
CPC .... G06F 16/248; G06F 16/24575; G06N 5/02
See application file for complete search history.

(56) References Cited

U.S. PATENT DOCUMENTS

| | | |
|---|---|---|
| 10,560,579 B1 | 2/2020 | Wu et al. |
| 11,227,342 B2 | 1/2022 | Wu et al. |
| 2017/0118512 A1 | 4/2017 | Stathacopoulos et al. |
| 2019/0012319 A1 | 1/2019 | Zhu et al. |
| 2021/0019309 A1 | 1/2021 | Yadav et al. |
| 2022/0083541 A1 | 3/2022 | Pichaimurthy et al. |

Primary Examiner — Jorge A Casanova
(74) Attorney, Agent, or Firm — Haley Guiliano LLP

(57) ABSTRACT

Systems and methods are provided for automatically recommending content. One example method includes receiving, from a computing device, a request for content and generating an initial result set in response to the request. A user profile associated with the request is identified. Based on the initial result set and the user profile, a positivity index score for the initial result set is determined. Based on the positivity index score, a type of additional content to add to the initial result set is determined. A modified result set is generated by adding the additional content to the initial result set. At least a portion of the modified result set is transmitted to the computing device.

18 Claims, 7 Drawing Sheets

SYSTEMS AND METHODS FOR AUTOMATICALLY RECOMMENDING CONTENT

CROSS-REFERENCE TO RELATED APPLICATION

This is a continuation of U.S. patent application Ser. No. 17/020,385, filed on Sep. 14, 2020. The content of which is incorporated herein by reference in its entirety.

BACKGROUND

The disclosure relates to automatically recommending content and, in particular, systems and related methods for recommending content based on an initial result of a query.

SUMMARY

With the proliferation of computing devices, such as smart TVs, laptops, smartphones, tablets, and smart speakers, there has been an increase in the use of systems that provide query results, news articles, or other types of digital content to users. For example, a content provider system may provide to a user news items via a news feed that aggregates news stories. Such a system often provides content of a first type based on a variety of factors, such as current events. For example, when a significant event such as an economic recession occurs, the majority of content provided to the user may be directed towards the recession, which is an example of content of a first type. If the user performs a query based on the recession, this may be recorded by a content provider and used to recommend further content directed towards the recession, reinforcing the provision of content of the first type. If a user is worried about the recession and inputs into the system a query, for example, directed towards "impact of recession on investments," this may be recorded by the content provider system and used to recommend further content directed towards the recession, again reinforcing the provision of content of the first type. As such, the system may provide the user with excess content of a first type. In view of the foregoing, it would be beneficial to have a system that can automatically recommend content of a variety of types based on characteristics of the content, for instance, to provide a set of content having a more balanced breadth of type.

In accordance with a first aspect of the disclosure, a method is provided for automatically recommending content. The method includes receiving, from a computing device, a request for content and generating an initial result set in response to the request. A user profile associated with the request is identified. Based on the initial result set and the user profile, a positivity index score for the initial result set is determined. Based on the positivity index score, a type of additional content to add to the initial result set is determined. A modified result set is generated by adding the additional content to the initial result set. At least a portion of the modified result set is transmitted to the computing device. In some embodiments, determining the type of additional content to add to the initial result set further comprises comparing the positivity index score to a threshold value; and if the positivity index score is above the threshold value, adding content of a first type to the initial result set; or if the positivity index score is below the threshold value, adding content of a second type to the initial result set.

In some embodiments, determining the positivity index score further comprises comparing the determined positivity index score with a time-averaged positivity index score and weighting the positivity index score based on the time-averaged positivity index score. In some embodiments, determining the positivity index score further comprises building a user knowledge graph, wherein the user knowledge graph is based on the user profile and comprises a plurality of fields; building an initial result set knowledge graph for each result in the initial result set, wherein each of the initial result set knowledge graphs comprises a plurality of fields; determining a component positivity index between one or more fields in each of the initial result set knowledge graphs and one or more fields of the user knowledge graph; and determining the positivity index score based on the computed component positivity indices.

In some embodiments, the method further comprises determining, based on the modified result set and the user profile, a positivity index score for the modified result set; comparing the positivity index score of the modified result set to a threshold value to determine whether to add further additional content of a first type or a second type to the modified result set; if the positivity index is above or below the threshold value, respectively generating a second modified result set by adding the additional content of a first type or a second type to the modified result set; and transmitting, to the computing device and in place of the modified result set, at least a portion of the second modified result set.

In some embodiments, the positivity index score is determined, at least in part, with a positivity analyzer engine. In some embodiments, the positivity index score is determined, at least in part, with a positivity analyzer engine, wherein the positivity analyzer engine maintains a set of key value pairs to link a component of the user profile with a component of the initial result set. In some embodiments, a server is configured to receive the request for content, and the server performs at least one of generating the initial result set, determining the positivity index score for the initial result set, determining the type of additional content to add to the initial result set, generating a modified result set and/or transmitting at least a portion of the modified result set. In some embodiments, the modified result set comprises news. In some embodiments, the user profile comprises at least one of age, occupation, location, financial status and/or health condition.

In accordance with a second aspect of the disclosure, a system is provided for automatically recommending content. The system includes a communication port and control circuitry. The control circuitry is configured to receive, from a computing device via the communication port, a request for content and generate an initial result set in response to the request. A user profile associated with the request is identified. Based on the initial result set and the user profile, a positivity index score for the initial result set is determined. Based on the positivity index score, a type of additional content to add to the initial result set is determined. A modified result set is generated by adding the additional content to the initial result set. At least a portion of the modified result set is transmitted to the computing device via the communication port. In some embodiments, the control circuitry configured to determine the type of additional content to add to the initial result set is further configured to compare the positivity index score to a threshold value; and if the positivity index score is above the threshold value, add content of a first type to the initial result set; or if the positivity index score is below the threshold value, add content of a second type to the initial result set.

In some embodiments, the control circuitry configured to determine the positivity index score is further configured to compare the determined positivity index score with a time-averaged positivity index score and weight the positivity index score based on the time-averaged positivity index score. In some embodiments, the control circuitry configured to determine the positivity index score is further configured to build a user knowledge graph, wherein the user knowledge graph is based on the user profile and comprises a plurality of fields; build an initial result set knowledge graph for each result in the initial result set, wherein each of the initial result set knowledge graphs comprises a plurality of fields; determine a component positivity index between one or more fields in each of the initial result set knowledge graphs and one or more fields of the user knowledge graph; and determine the positivity index score based on the computed component positivity indices.

In some embodiments, the control circuitry is further configured to determine, based on the modified result set and the user profile, a positivity index score for the modified result set; compare the positivity index score of the modified result set to a threshold value to determine whether to add further additional content of a first type or a second type to the modified result set; if the positivity index is above or below the threshold value, respectively generate a second modified result set by adding the additional content of a first type or a second type to the modified result set; and transmit, to the computing device and in place of the modified result set, at least a portion of the second modified result set.

In some embodiments, the control circuitry configured to determine the positivity index score is further configured to determine the positivity index score, at least in part, with a positivity analyzer engine. In some embodiments, the control circuitry configured to determine the positivity index score is further configured to determine the positivity index score, at least in part, with a positivity analyzer engine, wherein the positivity analyzer engine maintains a set of key value pairs to link a component of the user profile with a component of the initial result set. In some embodiments, a server is configured to receive the request for content, and the server comprises control circuitry configured to perform at least one of generating the initial result set, determining the positivity index score for the initial result set, determining the type of additional content to add to the initial result set, generating a modified result set and/or transmitting at least a portion of the modified result set. In some embodiments, the control circuitry configured to generate a modified result set is further configured to generate a modified result set comprising news. In some embodiments, the control circuitry is further configured to identify a user profile comprising at least one of age, occupation, location, financial status and/or health condition.

In accordance with a third aspect of the disclosure, a non-transitory computer-readable medium is provided having non-transitory computer-readable instructions encoded thereon for automatically recommending content that, when executed by control circuitry, cause the control circuitry to receive, from a computing device, a request for content; generate an initial result set in response to the request; identify a user profile associated with the request; determine, based on the initial result set and the user profile, a positivity index score for the initial result set; determine, based on the positivity index score, a type of additional content to add to the initial result set; generate a modified result set by adding the additional content to the initial result set; and transmit, to the computing device, at least a portion of the modified result set. In some embodiments, execution of the instruction to determine the type of additional content to add to the initial result set further causes the control circuitry to compare the positivity index score to a threshold value; and if the positivity index score is above the threshold value, add content of a first type to the initial result set; or if the positivity index score is below the threshold value, add content of a second type to the initial result set.

In some embodiments, execution of the instruction to determine the positivity index score further causes the control circuitry to compare the determined positivity index score with a time-averaged positivity index score and weight the positivity index score based on the time-averaged positivity index score. In some embodiments, execution of the instruction to determine the positivity index score further causes the control circuitry to build a user knowledge graph, wherein the user knowledge graph is based on the user profile and comprises a plurality of fields; build an initial result set knowledge graph for each result in the initial result set, wherein each of the initial result set knowledge graphs comprises a plurality of fields; determine a component positivity index between one or more fields in each of the initial result set knowledge graphs and one or more fields of the user knowledge graph; and determine the positivity index score based on the computed component positivity indices.

In some embodiments, execution of the instructions further causes the control circuitry to determine, based on the modified result set and the user profile, a positivity index score for the modified result set; compare the positivity index score of the modified result set to a threshold value to determine whether to add further additional content of a first type or a second type to the modified result set; if the positivity index is above or below the threshold value, respectively generate a second modified result set by adding the additional content of a first type or a second type to the modified result set; and transmit, to the computing device and in place of the modified result set, at least a portion of the second modified result set.

In some embodiments, execution of the instruction to determine the positivity index score further causes the control circuitry to determine the positivity index score, at least in part, with a positivity analyzer engine. In some embodiments, execution of the instruction to determine the positivity index score further causes the control circuitry to determine the positivity index score, at least in part, with a positivity analyzer engine, wherein the positivity analyzer engine maintains a set of key value pairs to link a component of the user profile with a component of the initial result set. In some embodiments, a server is configured to receive the request for content, and the server having non-transitory computer-readable instructions encoded thereon that, when executed by control circuitry, cause the control circuitry to perform at least one of generating the initial result set, determining the positivity index score for the initial result set, determining the type of additional content to add to the initial result set, generating a modified result set and/or transmitting at least a portion of the modified result set. In some embodiments, execution of the instruction to generate a modified result set further causes the control circuitry to generate a modified result set comprising news. In some embodiments, execution of the instruction to identify a user profile further causes the control circuitry to identify a user profile comprising at least one of age, occupation, location, financial status and/or health condition.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout and in which.

DETAILED DESCRIPTION

Methods and systems are disclosed herein for automatically recommending content. As referred to herein, content is any information that can be categorized and communicated to a user. For example, content may comprise news articles. Content may be displayed and/or played back to a user as text, a video, a series of pictures, audio or as a combination of any of these. The disclosed methods and systems may be implemented on a computing device. As referred to herein, the computing device can be any device comprising a processor and memory, for example a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory ("RAM"), etc.

Figure 1:
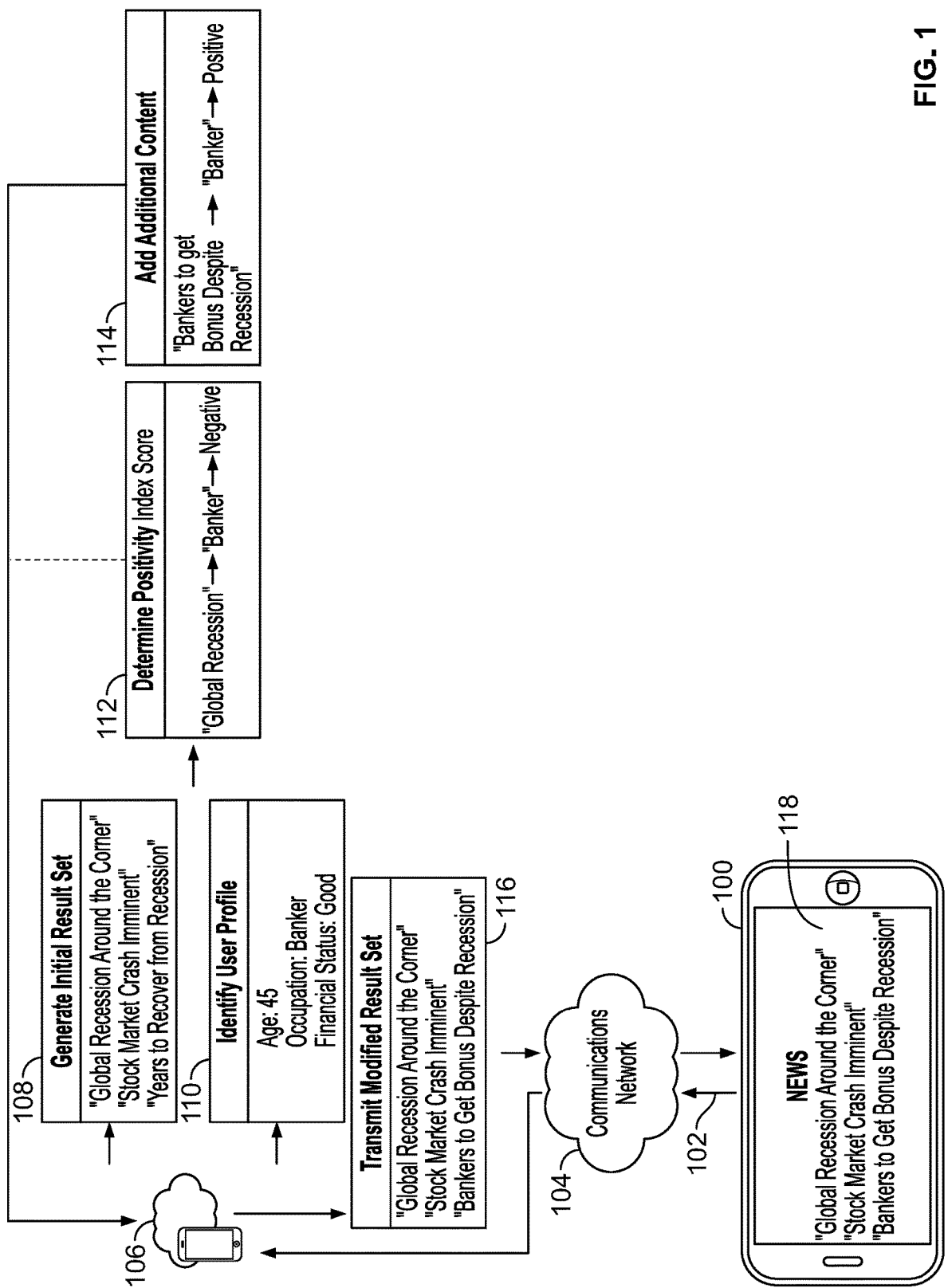
FIG. 1 shows an exemplary environment in which a request for content is received and content is automatically recommended, in accordance with some embodiments of the disclosure.

FIG. 1 shows an exemplary environment in which a request for content is received and content is automatically recommended. A computing device 100 sends 102 a request for content via a communications network 104 to a server 106. In the depicted example, the request comprises a request for "financial news headlines." However, the content may comprise any information that can be categorized and communicated to a user. The request may be sent in response to a user opening a dedicated app, such as a news app, on the computing device. Alternatively, the request may comprise a user subscribing to a news alert service, such as via email or an RSS feed. Alternatively, the request may comprise a request from an app that shows news headlines to a user. The request may be from a user performing a search for content via, for example a web browser or a smart speaker. The content may be text, a video, a series of pictures, audio or a combination of any of these. The communications network 104 may be any suitable network, such as the internet, a local network and/or a wireless network. The server 106 processes the request for content to generate an initial result set 108 comprising content. In the depicted example, the initial result set comprises a set of "financial news headlines," as requested; however, the initial result set can comprise any information that can be categorized and communicated to a user. The server 106 identifies a user profile 110. The user profile can be a profile that is provided by a third party or by the user themself. Alternatively, the user profile may be stored in a database at the server and accessed on demand, or information about the user can be collected at the server 106 and generated at the server 106 in real time. Typically, the user profile comprises information about the user such as age, occupation, location, financial status and/or health condition. The user profile may comprise any other information about the user that can be used in determining the positivity index score, as discussed below. The server 106 determines, based on the initial result set and the user profile, a positivity index score 112 for the initial result set. The determining may be performed, at least in part, with a positivity analyzer engine. Such an engine may analyze the initial result set to determine the context of each result in the initial result set, based on the user profile. The engine may generate a score for each item in the initial result set, based on the context of the result in light of the user profile. A result of a first type may correspond to a section in the user profile such as occupation, and be given a positive score based on the context of the result in light of the user profile. A result of a second type may correspond to the same section in the user profile, but may be given a negative score based on the context of the result in light of the user profile. A result of a third type may correspond to a different section in the user profile such as health, and be assigned zero based on the context of the result in light of the user profile. More than one section of the user profile may be relevant to a result, and more than one result may be relevant to a single section of the user profile. The type may relate to whether the result corresponds positively or negatively to the user profile. A negative score may be a negative decimal up to −1. and the positive score may be a positive decimal up to 1. Any scoring system may be used. A negative score may be associated with a news article that corresponds "negatively" to a section in the user profile and a positive score may be associated with a news article that corresponds "positively" to a section in the user profile. In the depicted example, the news headline "Global recession around the corner" corresponds to the user's occupation of "banker." As a "Global recession" is likely to negatively impact a "banker," a "negative" positivity index score is assigned to the result "global recession around the corner." The scores for the different results may be summed to determine a positivity index score. Scores for results that relate to different sections of a user profile may be weighted differently. For example, results that relate to the age of a user may be weighted more heavily than results that relate to the occupation of a user. In this way, a positivity index score can be determined for an individual user. Additionally, the positivity engine may further take into account previous results that have been shown to the user. If a user has been presented with a similar result previously, the result may be given a larger weighting, to indicate that that particular result is being shown regularly. In this way, a time-averaged positivity index score may be determined. The server 106 proceeds to determine, based on the positivity index score, whether to add additional content to the initial result set 114 and, if additional content is to be added, the type of content to add to the initial result set. For example, a positivity index score with a large magnitude indicates that a user is receiving a large amount of that type of content. To reduce the amount of content of that type that a user receives, the server 106 determines content of a type that would reduce the magnitude of the positivity index score. A modified result set is generated by adding content to the initial result set. The modified result set is the combination of at least a part of the initial result set and the additional content. In the depicted example, the initial result set comprises results that are of a negative type with respect to the user's profile and hence leads to a negative positivity index score. In this example, to reduce the magnitude of the positivity index score, additional content is identified that is of a positive type with respect to the user's profile, "Bankers to get bonus despite recession." In this example, the additional content of a positive type is added to the initial result set to reduce the magnitude of the positivity index score of the initial result set. The server may compare the determined positivity index score, or the magnitude of the determined positivity index score, to a threshold positivity index score, and if the determined positivity index score is above the threshold (in the case of a positive score), then the server identifies a type of additional content to add to the initial result set and adds the additional content to the initial result set. This additional content may be of a type that reduces the magnitude positivity index score, such that the positivity index score is closer to or below the threshold value. The modified result set is transmitted 116, via the communications network 104 to the computing device 100. Once the computing device has received the modified result set, the computing device 100 displays the modified result set 118 and/or plays back the modified result set 118 to the user via a speaker. In the depicted example, the magnitude of the positivity index score of the modified result set is smaller than the magnitude of the positivity index score of the initial result set. The server 106 may perform the aforementioned steps 108-114 in realtime. Alternatively, the server 106 may anticipate receiving a request for content from a computing device 100 and perform the aforementioned steps 108-114 before the request is received. Once the request is received, the server 106 returns the modified result set in place of the initial result set. For example, if a computing device requests the daily headlines at 8:00 every day, the server may collect the daily headlines (i.e. the initial result set) from one or more sources at 7:30 and generate a modified result set such that when the computing device 100 requests the daily headlines at 8:00, the modified result set is transmitted to the computing device. If no additional content is to be added, step 114 is not performed, and the initial result set is transmitted to the user (as indicated by the dashed line at 112). In this case, step 116 should be read as "transmit initial result set". Once the computing device has received the initial result set, the computing device 100 displays the initial result set to the user.

Figure 2:
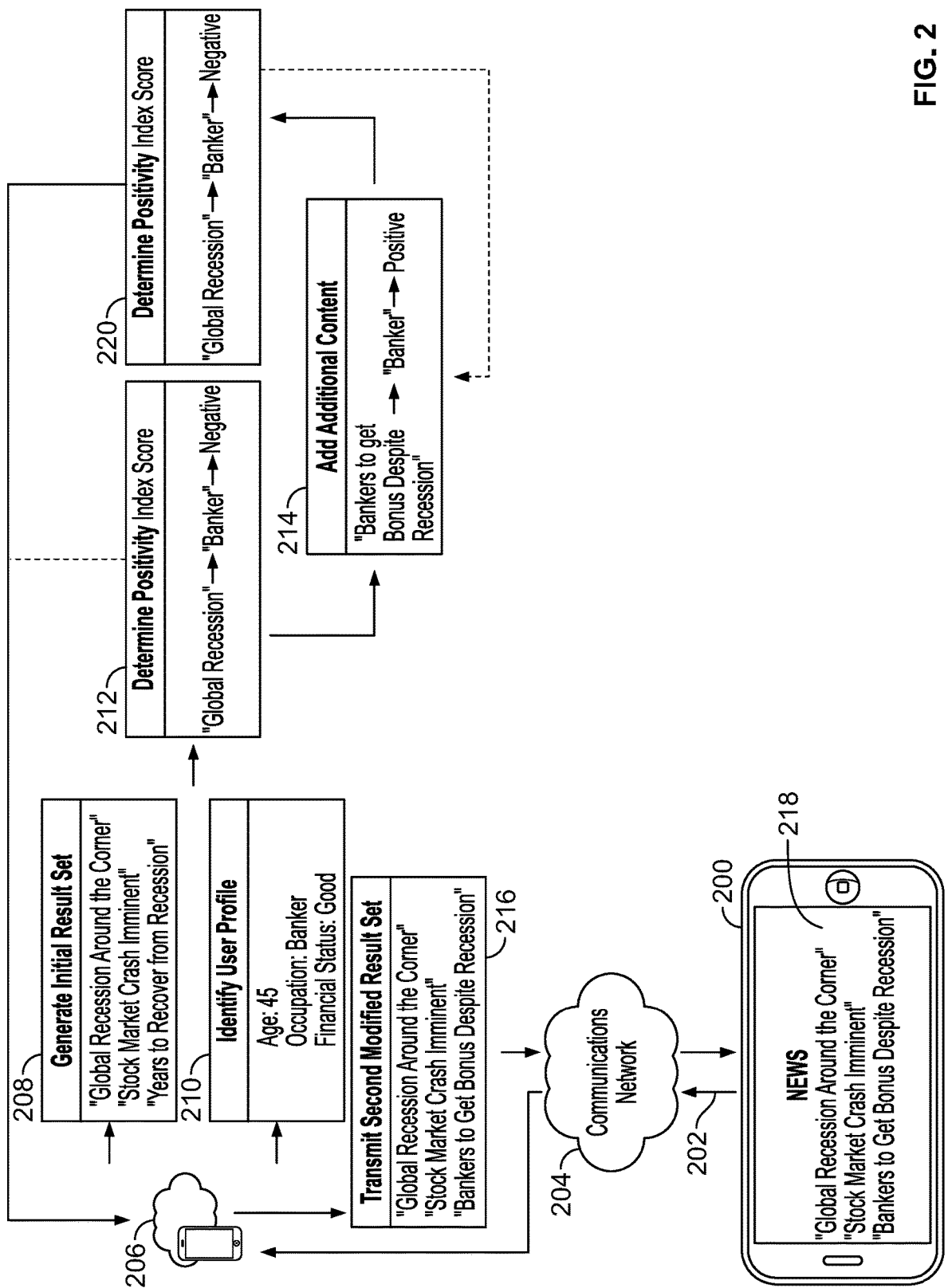
FIG. 2 shows another exemplary environment in which a request for content is received and content is automatically recommended, in accordance with some embodiments of the disclosure.

FIG. 2 shows another exemplary environment in which a request for content is received and content is automatically recommended. In a similar manner to the system described with respect to FIG. 1, a computing device 200 sends 202 a request for content via a communications network 204 to a server 206. Again, the server 206 processes the request for content to generate an initial result set 208 comprising content and identifies a user profile 210. In a similar manner, the server 206 determines, based on the initial result set and the user profile, a positivity index score 212 for the initial result set. Again, the server 206 proceeds to determine, based on the positivity index score, whether to add additional content to the initial result set 214 and, if content is to be added, the type of content to add to the initial result set. For example, a positivity index score with a large magnitude indicates that a user is receiving a large amount of that type of content. To reduce the amount of content of that type that a user receives, the server 206 determines content of a type that would reduce the magnitude of the positivity index score. A modified result set is generated by adding content to the initial result set. The modified result set is a combination of the at least a part of initial result set and the additional content. The server determines, based on the user profile and the modified result set, a positivity index score for the modified result set 220. This is determined in a similar manner to the positivity index score for the initial result set, as described above in connection with FIG. 1. Based on the positivity index score for the modified result set, the server 206 proceeds to determine, based on the positivity index score, whether to add additional content to the modified result set and, if content is to be added, the type of content to add to the modified result set. For example, a positivity index score with a large magnitude indicates that a user is receiving a large amount of that type of content. To reduce the amount of content of that type that a user receives, the server 206 determines content of a type that would reduce the magnitude of the positivity index score. A second modified result set is generated by adding content to the modified result set (as indicated by the dashed line between 214 and 220). The second modified result set is the combination of the initial result set and the additional content. A positivity index score is then determined for the second modified result set. The server 206 proceeds to determine, based on the positivity index score, whether to add additional content to the second modified result set and, if content is to be added, the type of content to add to second the modified result set. This loop continues until a requirement is met, for example, the positivity index score of the modified result set being above or below a threshold value. The second (or subsequent) modified result set is transmitted 216, via the communications network 204 to the computing device 200. Once the computing device has received the second (or subsequent) modified result set, the computing device 200 displays the second (or subsequent) modified result set 218 to the user and/or plays back the second (or subsequent) modified result set 218 to the user via a speaker. As before, the server 206 may perform the aforementioned steps 208-214 and 220 in realtime. Alternatively, the server 206 may anticipate receiving a request for content from a computing device 200 and perform the aforementioned steps 208-214 and 220 before the request is received. Once the request is received, the server 206 returns the second (or subsequent) modified result set in place of the initial result set. For example, if a computing device requests the daily headlines at 8:00 every day, the server may collect the daily headlines (i.e. the initial result set) from one or more sources at 7:30 and generate a modified result set such that when the computing device 100 requests the daily headlines at 8:00, the second (or subsequent) modified result set is transmitted to the computing device. If no additional content is to be added, steps 214 and 220 are not performed and the initial result set is transmitted to the user (as indicated by the dashed line at 212). In this case, step 216 should be read as "transmit initial result set". Once the computing device has received the initial result set, the computing device 200 displays the initial result set to the user.

Figure 3:
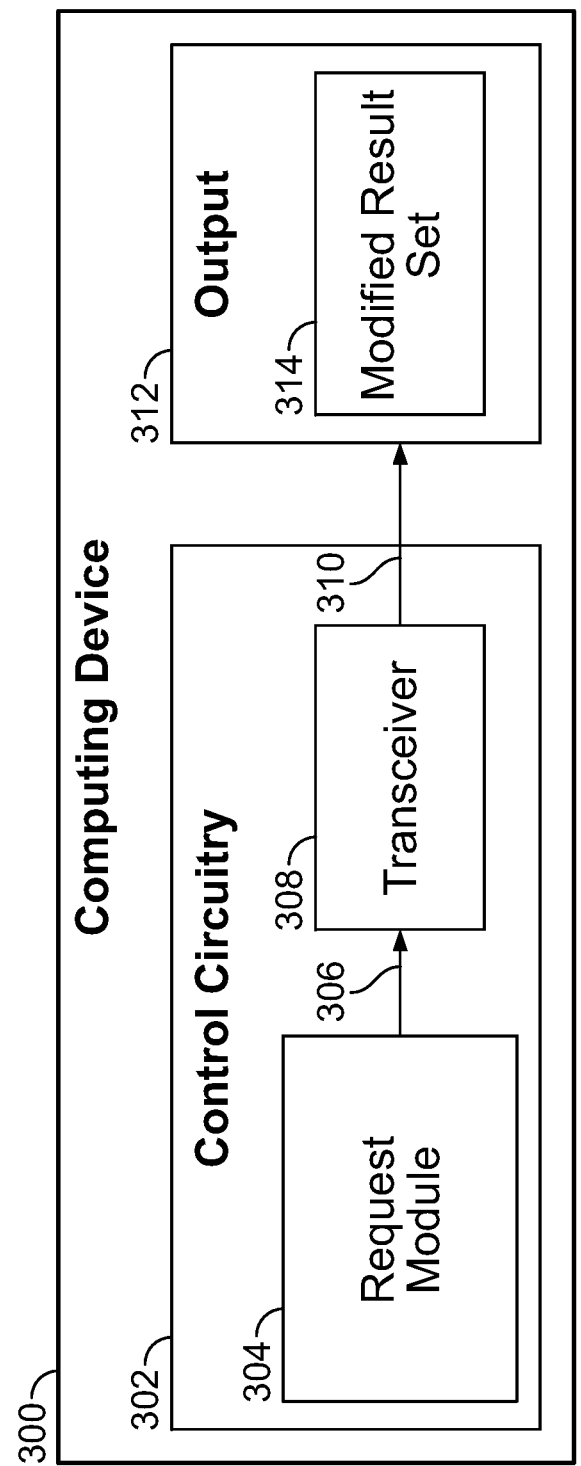
FIG. 3 is a block diagram representing components of a computing device and data flow therebetween for receiving a request for content and for outputting automatically recommended content, in accordance with some embodiments of the disclosure.

FIG. 3 is a block diagram representing components of a computing device and data flow therebetween for receiving a request for content and automatically recommending content, in accordance with some embodiments of the disclosure. Computing device 300 (e.g., a computing device 100, 200 as discussed in connection with FIGS. 1 and 2) comprises control circuitry 302 and an output module 312.

Control circuitry 302 comprises a request module 304 and a transceiver 308. Control circuitry 302 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

A request for content is generated at the request module 304. The request may be generated by a user providing input from a voice-user interface that is separate from computing device 300, such as a microphone, voice-enabled remote control, or other audio capture device. A voice input may be received as an analog signal from a microphone, or a digital audio signal. The digital audio signal may be raw audio data, or may be compressed, filtered, or encoded using any suitable audio compression or encoding format. In the case of a text query, the input may be in the form of a signal from a physical keyboard or a keyboard displayed on a screen. The input may also comprise a user drawing symbols that are recognized by the request module 304. The request may be sent in response to a user opening a dedicated app, such as a news app, on the computing device. Alternatively, the user may subscribe to a news alert service, such as via email or an RSS feed, and the request for content may be generated by the news alert service. Alternatively, the request may comprise a request from an app that shows news headlines to a user. If the request is generated by a device external to the computing device, for example, a via a microphone or a keyboard, transmission of the input to computing device 300 may be accomplished using a wired connection, such as an audio cable, USB cable, ethernet cable or the like, attached to a corresponding input port at computing device 300, or may be accomplished using a wireless connection, such as BLUETOOTH, WiFi, WiMax, GSM, UTMS, CDMA, TDMA, 3G, 4G, 4G LTE, or any other suitable wireless transmission protocol. The computing device 300 may comprise a physical input port such as a 3.5 mm audio jack, RCA audio jack, USB port, ethernet port, or any other suitable connection for receiving an input over a wired connection, or may comprise a wireless receiver configured to receive data via BLUETOOTH, WiFi, WiMax, GSM, UTMS, CDMA, TDMA, 3G, 4G, 4G LTE, or other wireless transmission protocols.

The transceiver 308 receives 306 the request for content from the request module 304 and transmits the request to a server. The transceiver 308 receives a modified result set from the server, as discussed above in connection with FIGS. 1 and 2 and below in connection with FIGS. 4-7. The output module 312 receives 310 the modified result set from the transceiver 308 and outputs the modified result set 314 to the user. As discussed above, the content is any information that can be categorized and communicated to a user and includes an article that predominantly comprises text, a video, a series of pictures, audio or as combination of any of these. The output module 312 may process the modified result set in any desired manner. The output module 312 may process the modified result set 314 so that it can be displayed to the user via a display, and/or may so that it can be played back via a speaker.

Figure 4:
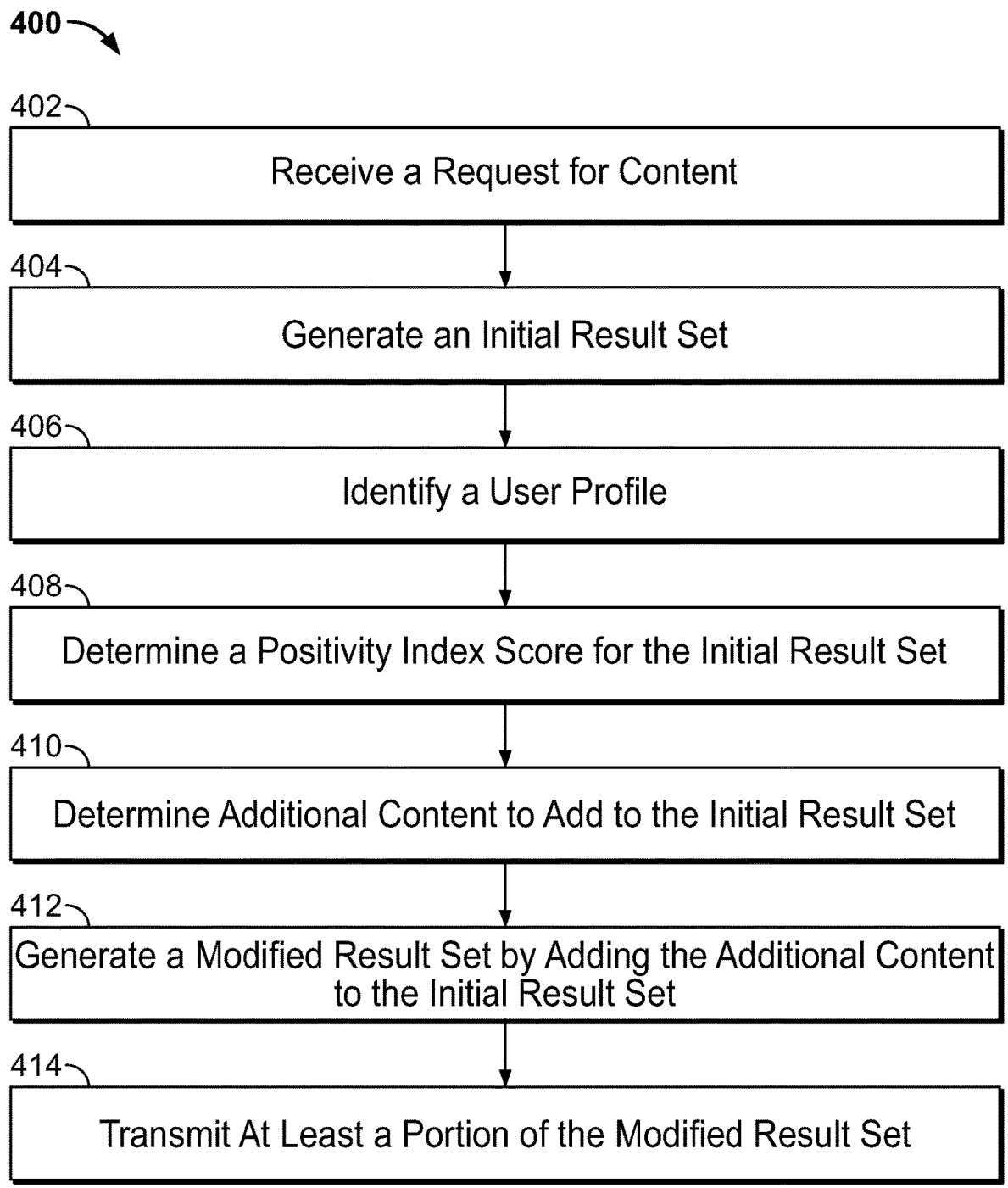
FIG. 4 is a flowchart representing a process for automatically recommending content, in accordance with some embodiments of the disclosure.

FIG. 4 is a flowchart representing an illustrative process 400 for receiving a request for content and automatically recommending content, in accordance with some embodiments of the disclosure. Process 400 may be implemented on any aforementioned computing device 100, 200, 300. In addition, one or more actions of process 400 may be incorporated into or combined with one or more actions of any other process or embodiment described herein.

At 402, computing device 100, 200, 300 receives a request for content. The request may be a voice request or a text request. In the case of a voice request, the voice request may be received as an analog signal from a microphone, or a digital audio signal. The digital audio signal may be raw audio data, or may be compressed, filtered, or encoded using any suitable audio compression or encoding format. In the case of a text request, the input may be in the form of a signal from a physical keyboard or a keyboard displayed on a screen. The input may also comprise a user drawing symbols that are recognized by the computing device 100, 200, 300.

At 404, an initial result set is generated. Typically, the request for content is transmitted to a server via a communications network, and an initial result set comprising content is generated at the server. As discussed above, content is any information that can be categorized and communicated to a user, for example, news. At 406 a user profile is identified. As before, the user profile typically comprises at least one of age, occupation, location, financial status and/or health condition. Again, the user profile can be a profile that is provided by a third party or by the user themself. Alternatively, the user profile may be stored in a database at the server and accessed on demand or information about the user can be collected at the server and generated at the server in real time.

At 408, a positivity index score is determined for the initial result set. The positivity index score is based on the initial result set and the user profile. The determining may be performed, at least in part, with a positivity analyzer engine. Such an engine analyzes the initial result set to determine the context of each result in the initial result set, based on the user profile. The engine generates a score for each item in the initial result set, based on the context of the result in light of the user profile. A result of a first type may correspond to a section in the user profile, such as occupation, and be given a positive score based on the context of the result in light of the user profile. A result of a second type may correspond to the same section in the user profile, but may be given a negative score based on the context of the result in light of the user profile. A result of a third type may correspond to a different section in the user profile, such as health, and be assigned zero based on the context of the result in light of the user profile. More than one section of the user profile may be relevant to a result and more than one result may be relevant to a single section of the user profile. The type may relate to whether the result corresponds positively or negatively to the user profile. A negative score may be a negative decimal up to −1, and the positive score may be a positive decimal up to 1. Any scoring system may be used. A negative score may be associated with a news article that corresponds "negatively" to a section in the user profile, and a positive score may be associated with a news article that corresponds "positively" to a section in the user profile. The scores for the different results may be summed to determine a positivity index score. Scores for results that relate to different sections of a user profile may be weighted differently. In this way, a positivity index score can be determined for an individual user. Additionally, the positivity engine may further take into account previous results that have been shown to the user. If a user has been presented with a similar result previously, the result may be given a larger weighting, to indicate that that particular result is being shown regularly. In this way, a time-averaged positivity index score may be determined.

At 410, it is determined, based on the positivity index score, whether to add additional content to the initial result set and, if additional content is to be added, the type of content to add to the initial result set. For example, a positivity index score with a large magnitude indicates that a user is receiving a large amount of that type of content. To reduce the amount of content of that type that a user receives, the server determines content of a type that would reduce the magnitude of the positivity index score. At 412, content is added to the initial result set to generate a modified result set, which is the combination of at least a part of the initial result set and the additional content.

At 414, the modified result set is transmitted to the computing device 100, 200, 300. Typically, the modified result set is transmitted via the communications network to the computing device 100, 200, 300. Once the computing device has received the modified result set, the computing device 100, 200, 300 typically displays the modified result set to the user and/or plays back the modified result set to the user via a speaker.

Figure 5:
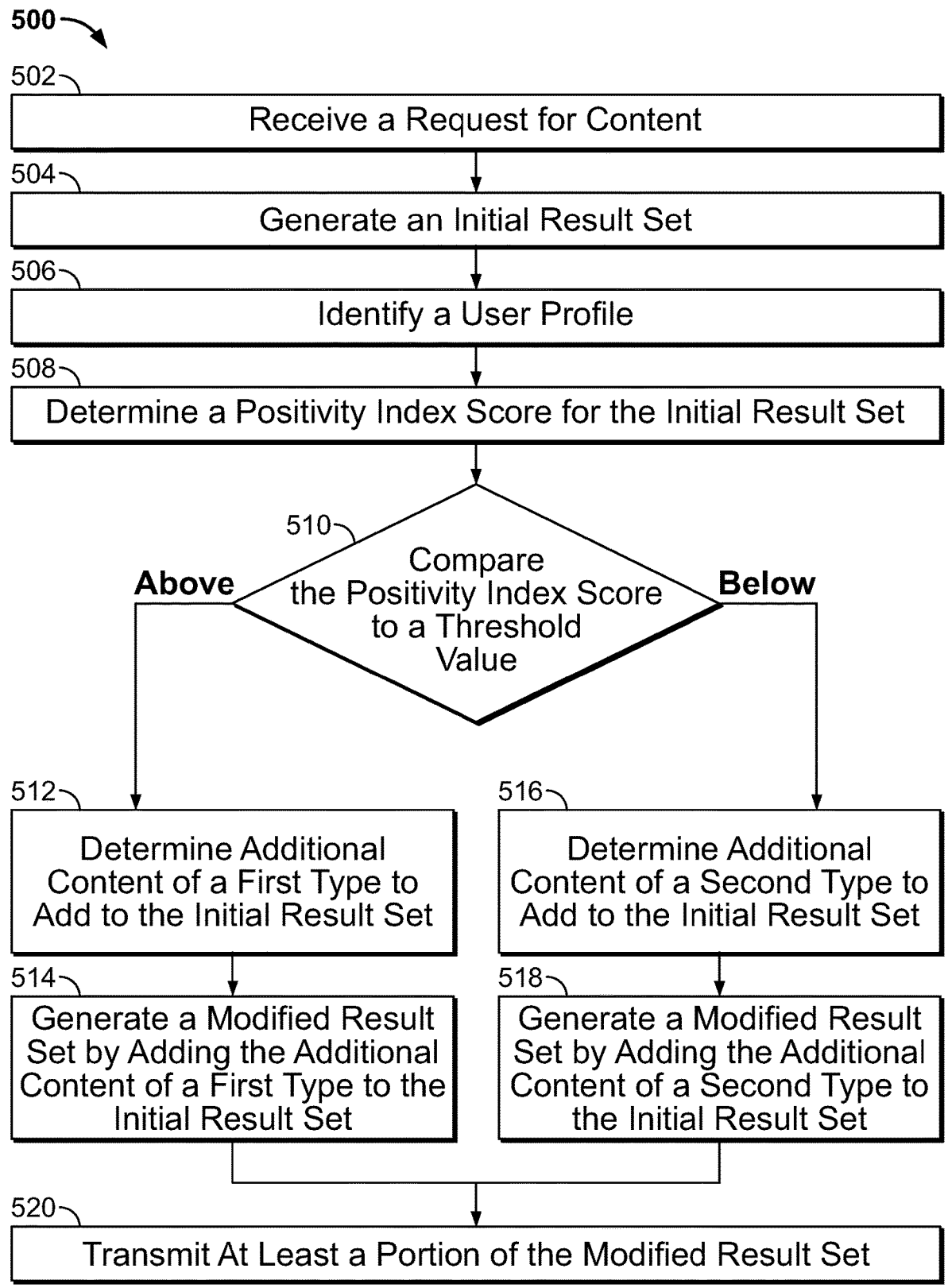
FIG. 5 is another flowchart representing a process for automatically recommending content, in accordance with some embodiments of the disclosure.

FIG. 5 is a flowchart representing an illustrative process 500 for receiving a request for content and automatically recommending content, in accordance with some embodiments of the disclosure. Process 500 may be implemented on any aforementioned computing device 100, 200, 300. In addition, one or more actions of process 500 may be incorporated into or combined with one or more actions of any other process or embodiment described herein.

In a similar manner, at 502, computing device 100, 200, 300 receives a request for content. The request may be a voice request or a text request. In the case of a voice request, the voice request may be received as an analog signal from a microphone, or a digital audio signal. The digital audio signal may be raw audio data, or may be compressed, filtered, or encoded using any suitable audio compression or encoding format. In the case of a text request, the input may be in the form of a signal from a physical keyboard or a keyboard displayed on a screen. The input may also comprise a user drawing symbols that are recognized by the computing device 100, 200, 300.

At 504, an initial result set is generated. Typically, the request for content is transmitted to a server via a communications network, and an initial result set comprising content is generated at the server. As discussed above, content is any information that can be categorized and communicated to a user, for example, news. At 506, a user profile is identified. As before, the user profile typically comprises at least one of age, occupation, location, financial status and/or health condition. Again, the user profile can be a profile that is provided by a third party or by the user themself. Alternatively, the user profile may be stored in a database at the server and accessed on demand, or information about the user can be collected at the server and generated at the server in real time.

At 508, a positivity index score is determined for the initial result set. The positivity index score is based on the initial result set and the user profile. The determining may be performed, at least in part, with a positivity analyzer engine. Such an engine analyzes the initial result set to determine the context of each result in the initial result set, based on the user profile. The engine generates a score for each item in the initial result set, based on the context of the result in light of the user profile. A result of a first type may correspond to a section in the user profile, such as occupation, and be given a positive score. A result of a second type may correspond to the same section in the user profile, but may be given a negative score, and a result of a third type may correspond to a different section in the user profile, such as health, and be assigned zero. The type may relate to whether the result corresponds positively or negatively to the user profile. A negative score may be a negative decimal up to −1 and the positive score may be a positive decimal up to 1. Any scoring system may be used. A negative score may be associated with a news article that corresponds "negatively" to a section in the user profile, and a positive score may be associated with a news article that corresponds "positively" to a section in the user profile. The scores for the different results may be summed to determine a positivity index score. Scores for results that relate to different sections of a user profile may be weighted differently. In this way, a positivity index score can be determined for an individual user. Additionally, the positivity engine may further take into account previous results that have been shown to the user. If a user has been presented with a similar result previously, the result may be given a larger weighting, to indicate that that particular result is being shown regularly. In this way, a time-averaged positivity index score may be determined.

At 510, the determined positivity index score is compared to a threshold value. If the determined positivity index score or the magnitude of the determined positivity index score is above the threshold value, then, at 512, the server identifies a first type of additional content to add to the initial result set. At 514, content is added to the initial result set to generate a modified result set, which is the combination of at least a part of the initial result set and the additional content. If the determined positivity index score is below the threshold value, then, at 516, the server identifies a second type of additional content to add to the initial result set. At 518, content is added to the initial result set to generate a modified result set, which is the combination of at least a part of the initial result set and the additional content.

At 520, the modified result set is transmitted to the computing device 100, 200, 300. Typically the modified result set is transmitted via the communications network to the computing device 100, 200, 300. Once the computing device has received the modified result set, the computing device 100, 200, 300 typically displays the modified result set to the user and/or plays back the modified result set to the user via a speaker.

Figure 6:
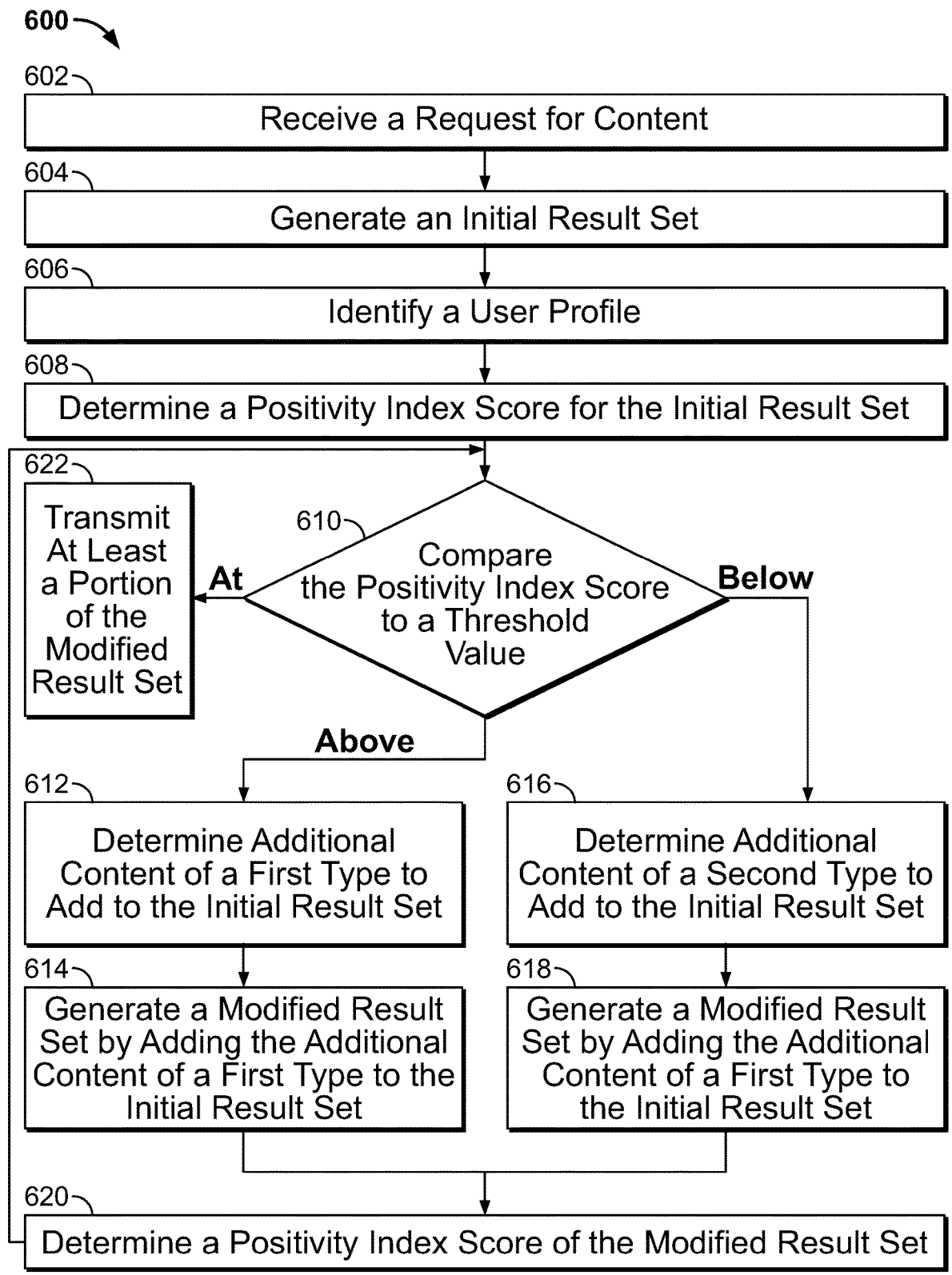
FIG. 6 is a further flowchart representing a process for automatically recommending content, in accordance with some embodiments of the disclosure.

FIG. 6 is a flowchart representing an illustrative process 600 for receiving a request for content and automatically recommending content, in accordance with some embodiments of the disclosure. Process 600 may be implemented on any aforementioned computing device 100, 200, 300. In addition, one or more actions of process 600 may be incorporated into or combined with one or more actions of any other process or embodiment described herein.

In a similar manner, at 602, computing device 100, 200, 300 receives a request for content. The request may be a voice request or a text request. In the case of a voice request, the voice request may be received as an analog signal from a microphone, or a digital audio signal. The digital audio signal may be raw audio data, or may be compressed, filtered, or encoded using any suitable audio compression or encoding format. In the case of a text request, the input may be in the form of a signal from a physical keyboard or a keyboard displayed on a screen. The input may also comprise a user drawing symbols that are recognized by the computing device 100, 200, 300.

At 604, an initial result set is generated. Typically, the request for content is transmitted to a server via a communications network, and an initial result set comprising content is generated at the server. As discussed above, content is any information that can be categorized and communicated to a user, for example, news. At 606, a user profile is identified. As before, the user profile typically comprises at least one of age, occupation, location, financial status and/or health condition. Again, the user profile can be a profile that is provided by a third party or by the user themself. Alternatively, the user profile may be stored in a database at the server and accessed on demand, or information about the user can be collected at the server and generated at the server in real time.

At 608, a positivity index score is determined for the initial result set. The positivity index score is based on the initial result set and the user profile. The determining may be performed, at least in part, with a positivity analyzer engine. Such an engine analyzes the initial result set to determine the context of each result in the initial result set, based on the user profile. The engine generates a score for each item in the initial result set, based on the context of the result in light of the user profile. A result of a first type may correspond to a section in the user profile, such as occupation, and be given a positive score. A result of a second type may correspond to the same section in the user profile, but may be given a negative score, and a result of a third type may correspond to a different section in the user profile, such as health, and be assigned zero. The type may relate to whether the result corresponds positively or negatively to the user profile. A negative score may be a negative decimal up to −1, and the positive score may be a positive decimal up to 1. Any scoring system may be used. A negative score may be associated with a news article that corresponds "negatively" to a section in the user profile, and a positive score may be associated with a news article that corresponds "positively" to a section in the user profile. The scores for the different results may be summed to determine a positivity index score. Scores for results that relate to different sections of a user profile may be weighted differently. In this way, a positivity index score can be determined for an individual user. Additionally, the positivity engine may further take into account previous results that have been shown to the user. If a user has been presented with a similar result previously, the result may be given a larger weighting, to indicate that that particular result is being shown regularly. In this way, a time-averaged positivity index score may be determined.

At 610, the determined positivity index score is compared to a threshold value. If the determined positivity index score is above the threshold value, or the magnitude of the determined positivity index score, then, at 612, the server identifies a first type of additional content to add to the initial result set. At 614, content is added to the initial result set to generate a modified result set, which is the combination of at least a part of the initial result set and the additional content. If the determined positivity index score is below the threshold value, then, at 616, the server identifies a second type of additional content to add to the initial result set. At 618, content is added to the initial result set to generate a modified result set, which is the combination of at least a part of the initial result set and the additional content.

At 620, a positivity index score of the modified result set is determined. This is determined in a similar manner to the positivity index score of the initial result set. At 610, the positivity index score of the modified result set is compared to the threshold value. If the positivity index score is above or below the threshold value, additional content of a first or second type is added to the modified result set to create a second modified result set at 612, 614, 616, 618. The positivity index score of the second modified result set is determined at 620, and this is compared to the threshold value at 610. This loop continues until the positivity index score of the second (or subsequent) modified result set is at the threshold value.

Once the positivity index score of the second (or subsequent) modified result set is at the threshold value, at 622, the second (or subsequent) modified result set is transmitted to the computing device 100, 200, 300. Typically the second (or subsequent) modified result set is transmitted via the communications network to the computing device 100, 200, 300. Once the computing device has received the second (or subsequent) modified result set, the computing device 100, 200, 300 typically displays the second (or subsequent) modified result set to the user and/or plays back the second (or subsequent) modified result set to the user via a speaker.

Figure 7:
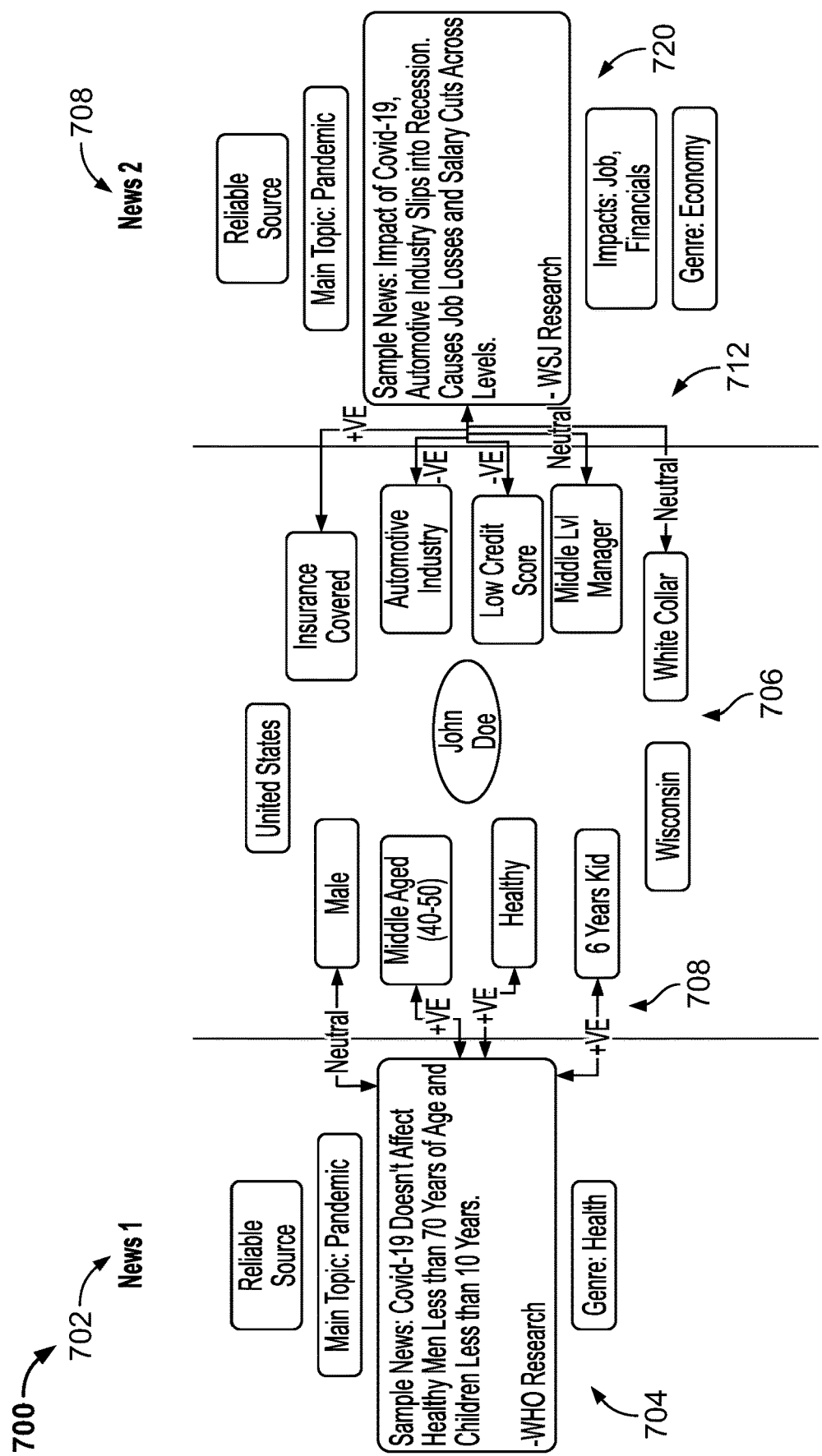
FIG. 7 shows how a positivity index score may be based on an initial result set and a user profile via the use of knowledge graphs, in accordance with some embodiments of the disclosure.

FIG. 7 shows how a positivity index score may be based on an initial result set and a user profile via the use of knowledge graphs 700. FIG. 7 comprises two examples of initial result sets 702, 708. In a first example, a knowledge graph 704 based on first initial results 702 is built. A knowledge graph 706 based on a user profile is also built. A score 708 is determined for each field in the knowledge graph 704 based on the first initial result set 702 and each field in the knowledge graph 706 based on the user profile. The scores for the different results may be summed to determine a positivity index score. Scores for results that relate to different sections of a user profile may be weighted differently. In this way, a positivity index score can be determined for an individual user. Additionally, the positivity engine may further take into account previous results that have been shown to the user. If a user has been presented with a similar result previously, the result may be given a larger weighting, to indicate that that particular result is being shown regularly. In this way, a time-averaged positivity index score may be determined. As can be seen, scores for the first initial result set are generally of a first type (e.g. positive). In a second example, a knowledge graph 710 based on second initial results 708 is built. A knowledge graph 706 based on a user profile is also built. A score 712 is determined for each field in the knowledge graph 710 based on the second initial result set 708 and each field in the knowledge graph 706 based on the user profile. These scores are calculated in the manner described in connection with the first example. As can be seen, scores for the second initial result set are generally of a second type (e.g. negative). Based on the positivity index score, results of a different type can be added to the initial results to change the positivity index score of the results. This helps, for example, to ensure that a user is not exposed to too much content of a certain type. The positivity analyzer engine, as described herein, may build knowledge graphs as described in connection with FIG. 7.

As an alternative and/or in addition to building knowledge graphs, the positivity analyzer engine may make use of key values pairs to determine a positivity index score. A profile field may have keywords associated with it, and the positivity analyzer engine may process initial results to identify those keywords and assign a score to the initial results based on the keywords identified. For example, a profile occupation "doctor" may have "patient" and "illness" as keywords associated with it. If the positivity analyzer engine processes a result and identifies those keywords, a score based on those keywords is assigned to the content. The positivity analyzer engine may process text, audio and/or video to identify keywords.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for automatically recommending content, the method comprising:
    receiving, from a computing device, a request for content;
    generating an initial result set in response to the request;
    identifying a user profile comprising a plurality of sections, the user profile associated with the request;
    determining a weighting for at least a sub-set of the plurality of sections of the user profile;
    determining, based on the initial result set and the user profile, a positivity index score for the initial result set based on at least a sub-section of the weighted sections of the user profile;
    determining, based on the positivity index score, a type of additional content to add to the initial result set;
    generating a modified result set by adding the additional content to the initial result set; and
    transmitting, to the computing device, at least a portion of the modified result set.

2. The method of claim 1, wherein:
    the initial result set comprises a plurality of results;
    the method further comprises determining whether one or more of the plurality of results has previously been received via the user profile; and
    determining the positivity index score further comprises determining a positivity index score for the initial result set based on whether one or more of the plurality of results has previously been received via the user profile.

3. The method of claim 1, wherein determining the type of additional content to add to the initial result set further comprises adding content of a type that reduces the magnitude of the positivity index score.

4. The method of claim 1, further comprising:
    anticipating receiving the request for content at first time; and wherein, at a second time before the first time:
        generating the initial result set in response to the request further comprises generating the initial result set in response to anticipating receiving the request;
        identifying the user profile associated with the request further comprises identifying the user profile associated with the anticipated request; and
    the method further comprises storing the at least a portion of the modified result set.

5. The method of claim 1, wherein determining the type of additional content to add to the initial result set further comprises:
    comparing the positivity index score to a threshold value; and
    if the positivity index score is above the threshold value, adding content of a first type to the initial result set; or
    if the positivity index score is below the threshold value, adding content of a second type to the initial result set.

6. The method of claim 1, wherein determining the positivity index score further comprises:
    building a user knowledge graph, wherein the user knowledge graph is based on the user profile and comprises a plurality of fields;
    building an initial result set knowledge graph for each result in the initial result set, wherein each of the initial result set knowledge graphs comprises a plurality of fields;
    determining a component positivity index between one or more fields in each of the initial result set knowledge graphs and one or more fields of the user knowledge graph; and
    determining the positivity index score based on the computed component positivity indices.

7. The method of claim 1, further comprising:
    determining, based on the modified result set and the user profile, a positivity index score for the modified result set;
    comparing the positivity index score of the modified result set to a threshold value to determine whether to add further additional content of a first type or a second type to the modified result set;
    if the positivity index is above or below the threshold value, respectively generating a second modified result set by adding the additional content of a first type or a second type to the modified result set; and
    transmitting, to the computing device and in place of the modified result set, at least a portion of the second modified result set.

8. The method of claim 1, wherein the positivity index score is determined, at least in part, with a positivity analyzer engine.

9. The method of claim 1, wherein the positivity index score is determined, at least in part, with a positivity analyzer engine and wherein the positivity analyzer engine maintains a set of key value pairs to link a component of the user profile with a component of the initial result set.

10. A system for automatically recommending content, the system comprising:
a communication port; and
control circuitry configured to:
receive, from a computing device via the communication port, a request for content;
generate an initial result set in response to the request;
identify a user profile comprising a plurality of sections, the user profile associated with the request;
determine a weighting for at least a sub-set of the plurality of sections of the user profile;
determine, based on the initial result set and the user profile, a positivity index score for the initial result set based on at least a sub-section of the weighted sections of the user profile;
determine, based on the positivity index score, a type of additional content to add to the initial result set;
generate a modified result set by adding the additional content to the initial result set; and
transmit, to the computing device via the communication port, at least a portion of the modified result set.

11. The system of claim 10, wherein:
the initial result set comprises a plurality of results;
the control circuitry is further configured to determine whether one or more of the plurality of results has previously been received via the user profile; and
the control circuitry configured to determine the positivity index score is further configured to determine a positivity index score for the initial result set based on whether one or more of the plurality of results has previously been received via the user profile.

12. The system of claim 10, wherein the control circuitry configured to determine the type of additional content to add to the initial result set is further configured to add content of a type that reduces the magnitude of the positivity index score.

13. The system of claim 10, wherein:
the control circuitry is further configured to anticipate receiving the request for content at first time; and wherein, at a second time before the first time:
the control circuitry configured to generate the initial result set in response to the request is further configured to generate the initial result set in response to anticipating receiving the request;
the control circuitry configured to identify the user profile associated with the request is further configured to identify the user profile associated with the anticipated request; and
the control circuitry is further configured to store the at least a portion of the modified result set.

14. The system of claim 10, wherein the control circuitry configured to determine the type of additional content to add to the initial result set is further configured to:
compare the positivity index score to a threshold value; and
if the positivity index score is above the threshold value, add content of a first type to the initial result set; or
if the positivity index score is below the threshold value, add content of a second type to the initial result set.

15. The system of claim 10, wherein the control circuitry configured to determine the positivity index score is further configured to:
build a user knowledge graph, wherein the user knowledge graph is based on the user profile and comprises a plurality of fields;
build an initial result set knowledge graph for each result in the initial result set, wherein each of the initial result set knowledge graphs comprises a plurality of fields;
determine a component positivity index between one or more fields in each of the initial result set knowledge graphs and one or more fields of the user knowledge graph; and
determine the positivity index score based on the computed component positivity indices.

16. The system of claim 10, wherein the control circuitry is further configured to:
determine, based on the modified result set and the user profile, a positivity index score for the modified result set;
compare the positivity index score of the modified result set to a threshold value to determine whether to add further additional content of a first type or a second type to the modified result set;
if the positivity index is above or below the threshold value, respectively generating a second modified result set by adding the additional content of a first type or a second type to the modified result set; and
transmit, to the computing device and in place of the modified result set, at least a portion of the second modified result set.

17. The system of claim 10, wherein control circuitry configured to determine the positivity index score is further configured to determine the positivity index score, at least in part, with a positivity analyzer engine.

18. The system of claim 10, wherein the control circuitry configured to determine the positivity index score is further configured to determine the positivity index score, at least in part with a positivity analyzer engine and wherein the positivity analyzer engine maintains a set of key value pairs to link a component of the user profile with a component of the initial result set.

* * * * *